United States Patent
Dageville et al.

(10) Patent No.: US 10,642,993 B1
(45) Date of Patent: *May 5, 2020

(54) DATA SHARING IN A MULTI-TENANT DATABASE SYSTEM

(71) Applicant: Snowflake Inc., San Mateo, CA (US)

(72) Inventors: Benoit Dageville, Foster City, CA (US); Thierry Cruanes, San Mateo, CA (US); Martin Hentschel, San Mateo, CA (US); Peter Povinec, Redwood City, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,103

(22) Filed: Jan. 31, 2020

Related U.S. Application Data (63) Continuation of application No. 15/402,906, filed on Jan. 10, 2017, now Pat. No. 10,592,681.

(51) Int. Cl.
*G06F 21/62* (2013.01)
*G06F 16/25* (2019.01)

(52) U.S. Cl.
CPC ........ *G06F 21/6218* (2013.01); *G06F 16/256* (2019.01); *G06F 2221/2145* (2013.01)

(58) Field of Classification Search
CPC ............... G06F 21/6218; G06F 16/256; G06F 2221/2145
See application file for complete search history.

(56) References Cited

U.S. PATENT DOCUMENTS

| | | |
|---|---|---|
| 6,732,100 B1 | 5/2004 | Brodersen et al. |
| 7,783,665 B1 | 8/2010 | Tormasov et al. |
| 9,774,586 B1 | 9/2017 | Roche et al. |
| 2009/0030906 A1 | 1/2009 | Doshi et al. |
| 2014/0280492 A1 | 9/2014 | Yang et al. |
| 2016/0203157 A1 | 7/2016 | Kuruganti et al. |
| 2016/0275160 A1 | 9/2016 | Motivala et al. |
| 2017/0099293 A1 | 4/2017 | Tan |
| 2018/0025174 A1 | 1/2018 | Mathur et al. |

OTHER PUBLICATIONS

The Snowflake Elastic Data Warehouse.

*Primary Examiner* — Michael R Vaughan
(74) *Attorney, Agent, or Firm* — Womble Bond Dickinson (US) LLP; Daniel E. Ovanezian (57) ABSTRACT

A method for sharing data in a multi-tenant database includes generating a share object in a first account comprising a share role. The method includes associating one or more access rights with the share role, wherein the one or more access rights indicate which objects in the first account are accessible based on the share object. The method includes granting, to a second account, cross-account access rights to the share role or share object in the first account. The method includes receiving a request from the second account to access data or services of the first account. The method further includes providing a response to the second account based on the data or services of the first account.

21 Claims, 7 Drawing Sheets

DATA SHARING IN A MULTI-TENANT DATABASE SYSTEM

CROSS REFERENCE TO RELATED APPLICATIONS

This application is a continuation of U.S. patent application Ser. No. 15/402,906, entitled "DATA SHARING IN A MULTI-TENANT DATABASE SYSTEM," filed on Jan. 10, 2017, which is incorporated herein in its entirety.

TECHNICAL FIELD

The present disclosure relates to databases and more particularly relates to data sharing in a multi-tenant database system.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
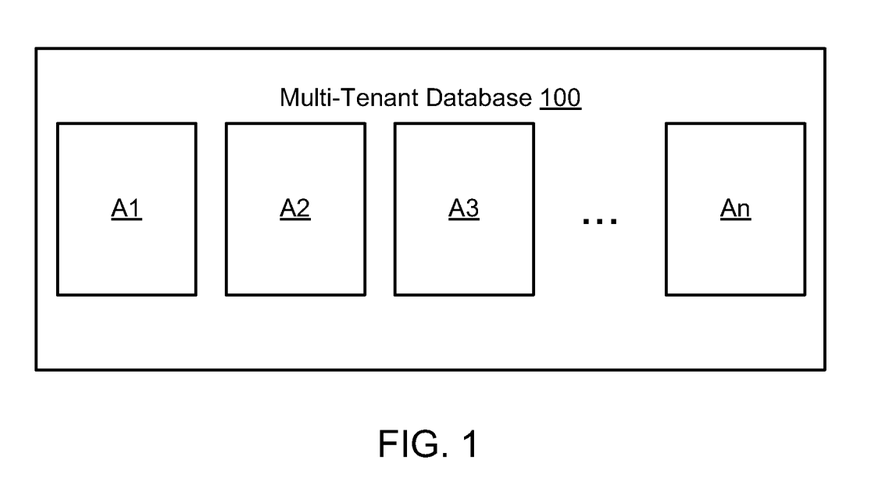
FIG. 1 is a schematic block diagram illustrating accounts in a multi-tenant database, according to one embodiment.

Multi-tenant databases or multi-tenant data warehouse support multiple distinct customer accounts at once. As an example, FIG. 1 is a schematic block diagram illustrating a multi-tenant database or data warehouse that supports many different customer accounts A1, A2, A3, An, etc. Customer accounts may be separated by multiple security controls, including different uniform resource locators (URLs) to connect to, different access credentials, different data storage locations (such as Amazon Web Services S3 buckets), and different account-level encryption keys. Thus, each customer may only be allowed to see, read, and/or write the customer's own data. By design it may be impossible for a customer to see, read, or write another customer's data. In some cases, strict separation of customer accounts is the backbone of a multi-tenant data warehouses or database system.

Applicants have recognized that it may sometimes be desirable to allow cross-account data sharing. However, no current multi-tenant database system allows sharing of data between different customer accounts in an instantaneous, zero-copy, easy-controllable fashion. Existing online data warehouses such as Amazon Redshift® do not support data sharing without physical data copying. On-premise database systems such as Oracle Database Server® or Microsoft SQL Server® do not support online data sharing by definition because of the physical distribution of individual database installations.

Based on the foregoing, Applicant has developed systems, methods, and devices for a multi-tenant online database system. Some embodiments allow sharing of data between different customer accounts and may make the data instantly accessible with no need to copy data. Some embodiments provide access to data using fine-grained controls to maintain separation of desired data while allowing access to data that a customer wishes to share.

According to one embodiment, a computer implemented method includes generating a share object in a first account comprising a share role. The method includes associating one or more access rights with the share role, wherein the one or more access rights indicate which objects in the first account are accessible based on the share object. The method includes granting, to a second account, cross-account access rights to the share role or share object in the first account. The method further includes receiving a request from the second account to access data or services of the first account and providing a response to the second account based on the data or services of the first account.

According to one embodiment, a multi-tenant database system includes a cross-account rights component, an alias component, and an access component. The cross-account rights component is configured to determine that cross-account access rights to one or more shared resources have been granted to a target account by a sharer account. The alias component is configured to create, in the target account, an alias object corresponding to a shared resource of the one or more shared resources in the sharer account. The access component is configured to allow the target account to access the shared resource using a request directed to the alias object.

According to another embodiment, a method for providing access to shared data in a multi-tenant database includes determining that a first account has granted a second account access to a database object of the first account. The method includes receiving a request from the second account to access the data object corresponding to the first account. The method includes processing the request using a virtual warehouse corresponding to the first account. The virtual warehouse includes a set of one or more compute nodes configured to access data in a storage layer corresponding to the first account to generate a response to the request.

Embodiments disclosed herein provide technology which may be used for sharing data between different customer accounts in an online database and/or online data warehouse. In one embodiment, data sharing is enabled using cross-account role grants that allow users in one customer account to access data in another customer account in a controlled and instantaneous fashion, without the need to copy data. For example, the shared date may remain within the sharing account while allowing a foreign account to perform queries or other processes on the account, within their rights (e.g., read, write, etc.).

Embodiments disclosed herein may be used for a variety of applications. In one embodiment, a database owner may share a sample data set with new customer accounts for tutorials and/or introduction. In one embodiment, demo data sets may be shared from one account with demo accounts for demoing a data warehouse or other service to potential customers. In one embodiment, usage data collected by a database provider or host may be easily shared with customer accounts. In one embodiment, publicly available data sets may be shared from a central account with customer accounts so that customer accounts do not have to ingest the data themselves. In one embodiment, customers are allowed to share data with other customers for easier access to shared resources, without the need to physically copy or transmit the data. In one embodiment, customers are allowed to easily share data with an administrator for investigation of support issues. According to one embodiment, customers or other account holders/owners may list information about their data on a market place for purchase/subscription. For example, some embodiments provide a market place to buy and sell data sets between customer accounts of a multi-tenant database or data warehouse.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Figure 2:
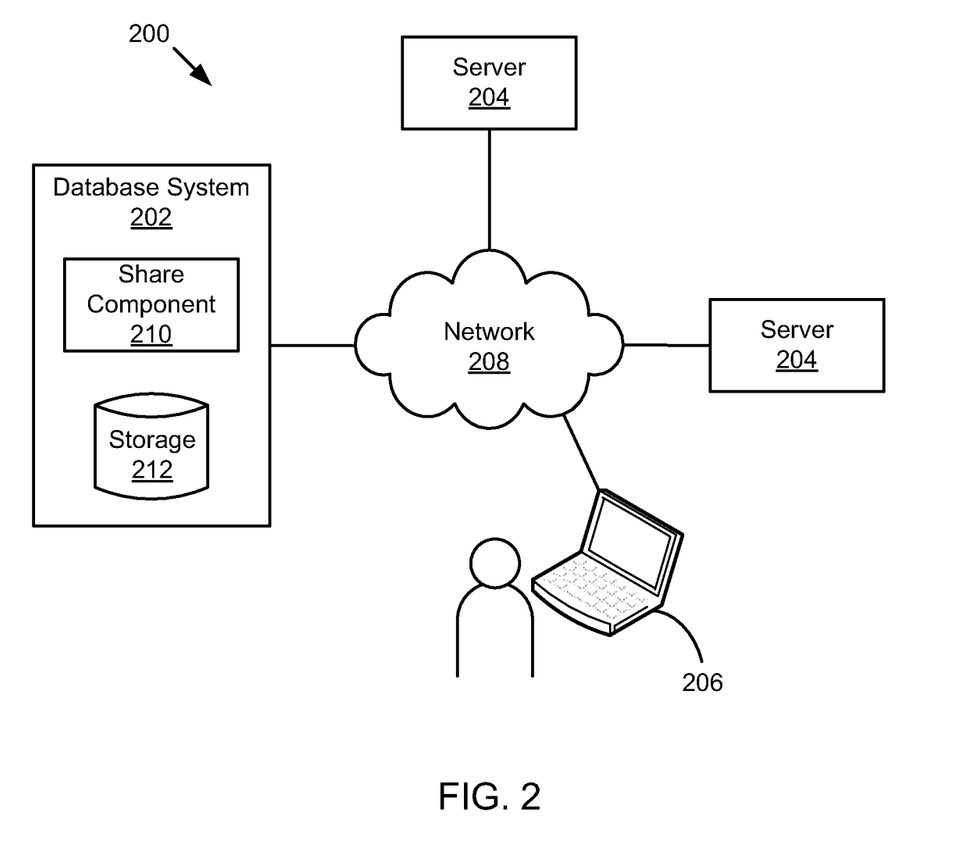
FIG. 2 is a schematic diagram illustrating a system for providing and accessing database services, according to one embodiment.

FIG. 2 is a schematic diagram of a system 200 for providing and accessing database data or services. The system 200 includes a database system 202, one or more servers 204, and a client computing system 206. The database system 202, the one or more servers 204, and/or the client computing system 206 may communicate with each other over a network 208, such as the Internet. For example, the one or more servers 204, and/or the client computing system 206 may access the database system 202 over the network 208 to query a database and/or receive data from a database. The data from the database may be used by the one or more servers 204 or client computing system 206 for any type of computing application. In one embodiment, the database system 202 is a multi-tenant database system hosting data for a plurality of different accounts.

The database system 202 includes a share component 210 and storage 212. The storage 212 may include storage media for storing data. For example, the storage 212 may include one or more storage devices for storing database tables, schemas, encryption keys, data files, or any other data. The share component 210 may include hardware and/or software for enabling the cross-account sharing of data or services. For example, the share component 210 may process queries/instructions received from remote devices to access shared data or share data. The queries/instructions may be received from the servers 204 or client computing system 106. In one embodiment, the share component 210 is configured to allow sharing data between accounts without creating duplicate copies of tables, data, or the like outside the sharing account. For example, the share component may allow for computer resources allocated to a sharing account to perform any queries or instructions provided by a foreign account.

In one embodiment, storage and compute resources for a database system 100 may be logically and/or physically separated. In one embodiment, storage is a common, shared resource across all accounts. Compute resources may be set up independently, per account, as virtual warehouses. In one embodiment, a virtual warehouse is a set of compute nodes that access data in a storage layer and compute a query result. Separating the compute nodes or resources from the storage allows scaling each layer independently. Separation of storage and compute also allows that shared data can be processed independently by different accounts, without the computation in one account affecting the computation in other accounts. That is, in at least some embodiments, there is no contention among computing resources when running queries on shared data.

Figure 3:
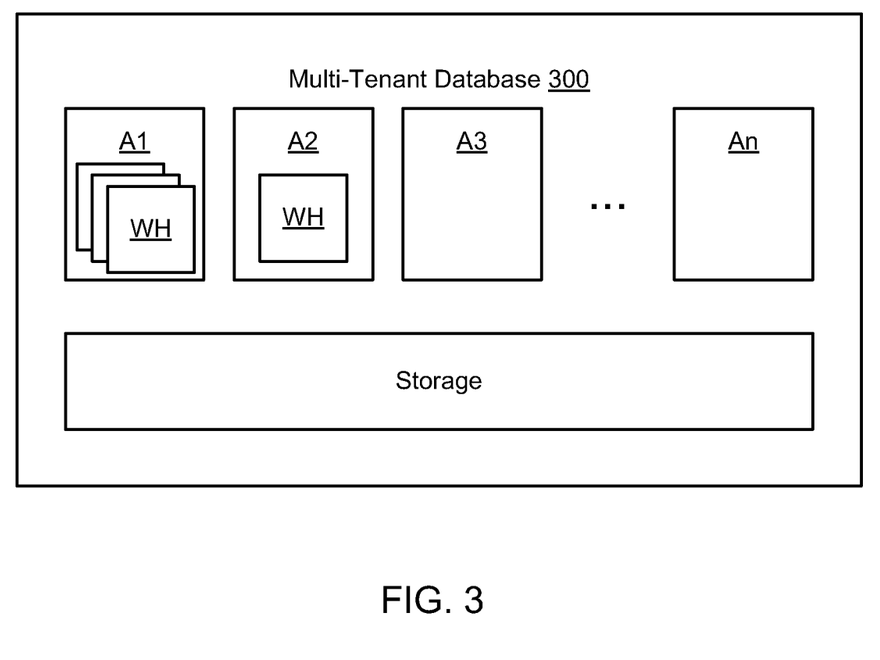
FIG. 3 is a schematic diagram illustrating a multi-tenant database with separation of storage and computing resources, according to one embodiment.

FIG. 3 is a schematic block diagram of a multi-tenant database 300 illustrating separation of storage and computing resources. For example, the multi-tenant database 300 may be a data warehouse where a plurality of different accounts (A1, A2, A3, through An) are hosted. In FIG. 3, account A1 has three virtual warehouses running, account A2 has one virtual warehouse running, and account A3 has no virtual warehouse running. In one embodiment, all of these virtual warehouses have access to the storage layer that is separated from the compute nodes of the virtual warehouses. In one embodiment, virtual warehouses can be dynamically provisioned or removed based on a current workload for an account.

In one embodiment, a database system 300 uses object hierarchies in accounts. For example, each customer account may contain object hierarchies. Object hierarchies are often rooted in databases. For example, databases may contain schemas and schemas, in turn, may contain objects such as tables, views, sequences, file formats, and functions. Each of these objects serves a special purpose: tables store relational or semi-structured data; views define logical abstractions over the stored data; sequences provide means to generate ever-increasing numbers; file formats define ways to parse ingested data files; and functions hold user-defined execution procedures.

Figure 4:
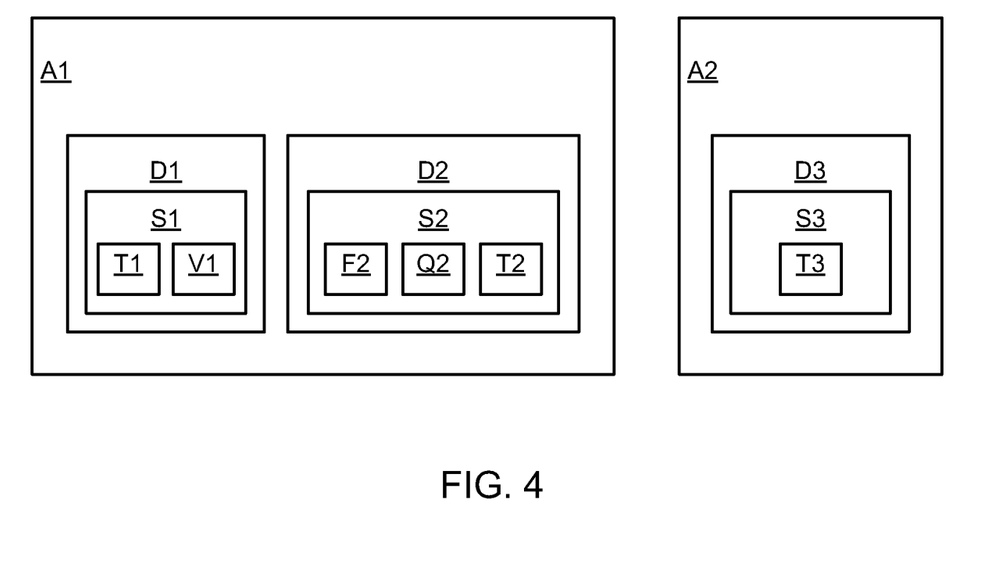
FIG. 4 is a schematic block diagram illustrating object hierarchies, according to one embodiment.

FIG. 4 is a schematic block diagram illustrating object hierarchies within customer accounts. Specifically, accounts may include hierarchies of objects which may be referenced in a database. For example, customer account A1 contains two databases objects D1 and D2. Database object D1 contains schema object S1, which in turn contains table object T1 and view object V1. Database object D2 contains schema object S2, which contains function object F2, sequence object Q2, and table object T2. Customer account A2 contains a database object D3 with schema object S3 and table object T3. The object hierarchies may control how objects, data, functions, or other information or services of an account or database system are accessed or referenced.

In one embodiment, a database system implements role-based access control to govern access to objects in customer accounts. In general, role-based access control consists of two basic principles: roles and grants. In one embodiment, roles are special objects in a customer account that are assigned to users. Grants between roles and database objects define what privileges a role has on these objects. For example a role that has a usage grant on a database can "see" this database when executing the command "show databases"; a role that has a select grant on a table can read from this table but not write to the table. The role would need to have a modify grant on the table to be able to write to it.

Figure 5:
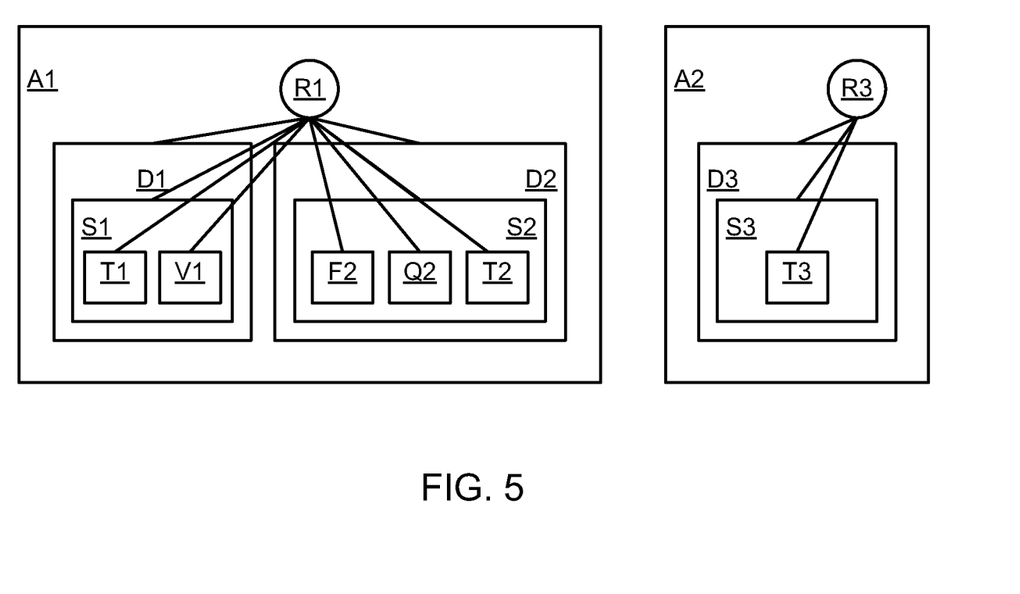
FIG. 5 is a schematic diagram illustrating role based access, according to one embodiment.

FIG. 5 is a schematic block diagram illustrating role based access to objects in customer accounts. A customer account A1 contains role R1, which has grants to all objects in the object hierarchy. Assuming these grants are usage grants between R1 and D1, D2, S1, S2 and select grants between R1 and T1, V1, F2, Q2, T2, a user with activated role R1 can see all objects and read data from all tables, views, and sequences and can execute function F2 within account A1. Customer account A2 contains role R3, which has grants to all objects in the object hierarchy. Assuming these grants are usage grants between R3 and D3, S3, and select a grant between R3 and T3, a user with activated role R3 can see all objects and read data from all tables, views, and sequences within account A2.

Figure 6:
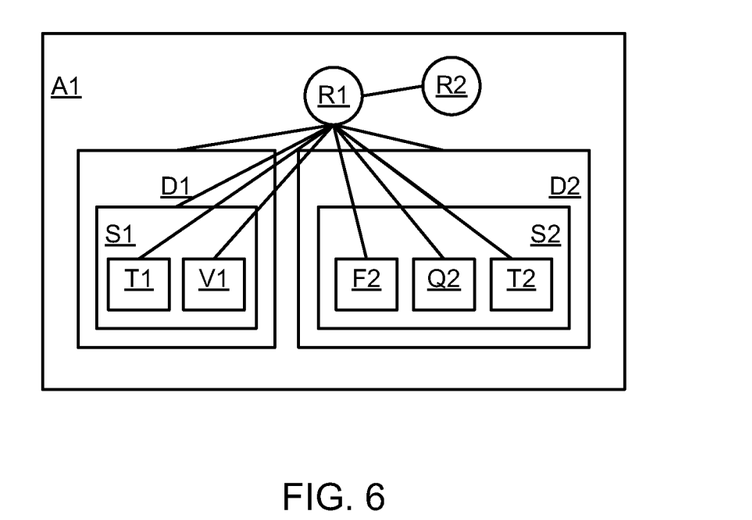
FIG. 6 is a schematic diagram illustrating a usage grant between roles, according to one embodiment.

FIG. 6 illustrates a usage grant between roles. With role-based access control, it is also possible to grant usage from one role to another role. A role that has a usage grant to another role "inherits" all access privileges of the other role. For example, in role R2 has a usage grant on role R1. A user (e.g., with corresponding authorization details) with activated role R2 can see and read from all objects because role R2 inherits all grants from role R1.

According to one embodiment, usage grants are granted across different accounts. An account that shares data may be referred to herein as a "sharer account" and an account with which the data is shared may be referred to herein as a "target account". In one embodiment, embodiments disclosed herein allow for instantaneous, zero-copy, easy-controllable cross-account sharing of data. In one embodiment, in order to share data with another account, a sharer account may generate a share object. Within the share object, a role may be created and a user of the sharer account may indicate access rights or grants are available to the role and/or foreign (or target accounts) that will be granted rights under the role. A target account may then be able to identify share objects or roles in other account to which the target account has been granted rights or access. In one embodiment, share objects in a sharer account may be imported into the target account using alias objects and cross-account role grants.

In one embodiment, data sharing is initiated by the account that owns the data to be shared. For example, the sharer account creates a new type of object, the share object. The share object has a unique name to be identified within the sharer account. For example, the name may need to be unique within an account, but not necessarily across accounts. Share objects may be created, modified, and deleted by referencing them via their name in the sharer account.

In one embodiment, each share object contains a single role. Grants between this role and objects define what objects are being shared and with what privileges these objects are shared. The role and grants may be similar to any other role and grant system in the implementation of role-based access control. By modifying the set of grants attached to the role in a share objects, more objects may be shared (by adding grants to the role), fewer objects may be shared (by revoking grants from the role), or objects may be shared with different privileges (by changing the type of grant, for example to allow write access to a shared table object that was previously read-only).

In one embodiment, a share objects also contains a list of references to other customer accounts. Only these accounts that are specifically in the share object may be allowed to look up, access, and/or import from this share object. By modifying the list of references of other customer accounts, the share object can be made accessible to more accounts or be restricted to fewer accounts.

Figure 7:
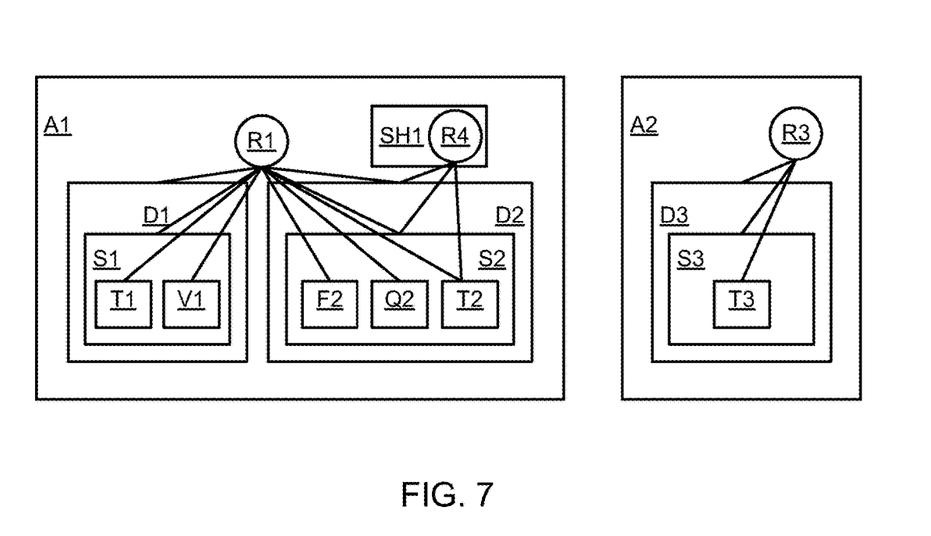
FIG. 7 is a schematic diagram illustrating a share object, according to one embodiment.

FIG. 7 is a schematic block diagram illustrating a share object SH1. Customer account A1 contains share object SH1. Share object SH1 has a unique name "SH1" in customer account A1. Share object SH1 contains role R4 with grants to database D2, schema S2, and table T2. The grants on database D2 and schema S2 may be usage grants and the grant on table T2 may be a select grant. In this case, table T2 in schema S2 in database D2 would be shared read-only. Share object SH1 contains a list of references to other customer accounts, including account A2.

After a share object is created, the share object may be imported or referenced by a target account listed in the share object. For example, importing a share object from a sharer account is possible from other customer accounts. A target account may run a command to list all available share objects for importing. Only if a share object was created with references that included the target account, the target account may list the share object and subsequently import it. In one embodiment, references to a share object in another account are always qualified by account name. For example, target account A2 would reference share SH1 in sharer account A1 with the example qualified name "A1.SH1".

In one embodiment, a process or importing a share object may include: creating an alias object in the target account; linking the alias object with the top-most shared object in the sharer account in the object hierarchy; granting a role in the target account usage privileges to the alias object; and granting the target account role usage privileges to the role contained in the share object.

In one embodiment, a target account that imports the share object or data creates an alias object. An alias object is similar to a normal object in a customer account. An alias object has its own unique name with which it is identified. An alias object may be linked to the top-most object in each object hierarchy that is shared. If multiple object hierarchies are shared, multiple alias objects may be created in the target account. Whenever an alias object is used (e.g., reading from the alias object, writing to the alias object), the alias object is internally replaced by the normal object in the sharer account to which it links. This way, alias objects are merely proxy objects of normal objects, and not duplicate objects. Thus, when reading from or writing to an alias object, the operations affect the original object that the alias links to. Similar to normal objects, when an alias object is created it is granted to the activated role of the user.

In addition to the alias object, a grant between a role in the target account and the role contained in the share object is created. This is a usage grant from role to role across customer accounts. Role-based access control now allows a user in the target account to access objects in the sharer account.

Figure 8:
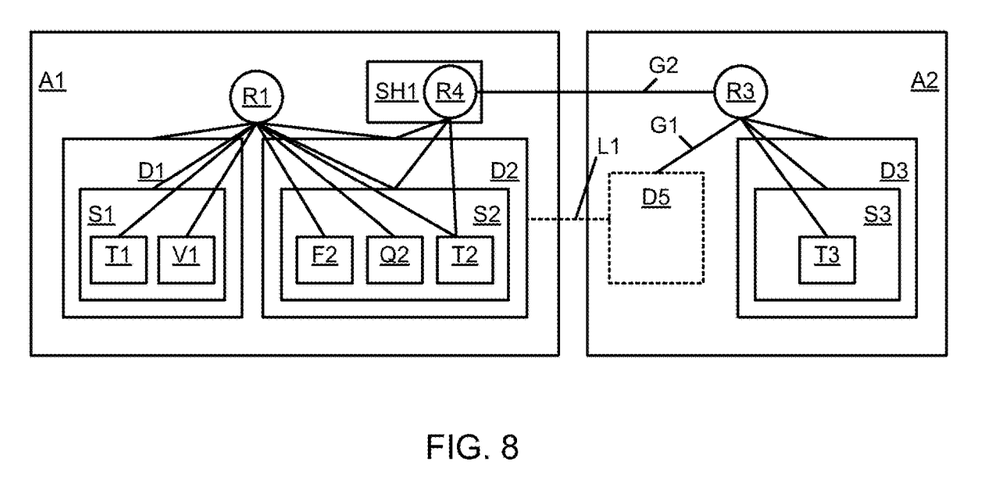
FIG. 8 is a schematic diagram illustrating cross-account grants, according to one embodiment.

FIG. 8 is a schematic block diagram illustrating logical grants and links between different accounts. A database alias object D5 is created in account A2. Database alias D5 references database D2 via link L1. Role R3 has a usage grant G1 on database D5. Role R3 has a second usage grant G2 to role R4 in customer account A1. Grant G2 is a cross-account grant between accounts A1 and A2. In one embodiment, role-based access control allows a user in account A2 with activated role R3 to access data in account A1. For example, if a user in account A2 wants to read data in table T2, role-based access control allows that because role R3 has a usage grant of role R4 and role R4, in turn, has a select grant on table T2. By way of illustration, a user with activated role R3 may access T2 by running a query or selection directed to "D5.S2.T2".

Using object aliases and cross-account grants from a role in the target account to a role in the sharer account allows users in the target account to access information in the sharer account. In this way, a database system may enable sharing of data between different customer accounts in an instantaneous, zero-copy, easy-controllable fashion. The sharing can be instantaneous because alias objects and cross-account grants can be created in milliseconds. The sharing can be zero-copy because no data has to be duplicated in the process. For example, all queries, or selections can be made directly to the shared object in the sharer account without creating a duplicate in the target account. The sharing is also easy to control because it utilizes easy-to-use techniques of role-based access control. Additionally, in embodiments with separated storage and compute, there is no contention among computing resources when executing queries on shared data. Thus, different virtual warehouses in different customer accounts may individually process shared data. For example, a first virtual warehouse for a first account may process a database query or statement using data shared by a sharer account and a second virtual warehouse for a second account, or the sharer account, may process a database query or statement using the shared data of the sharer account.

Figure 9:
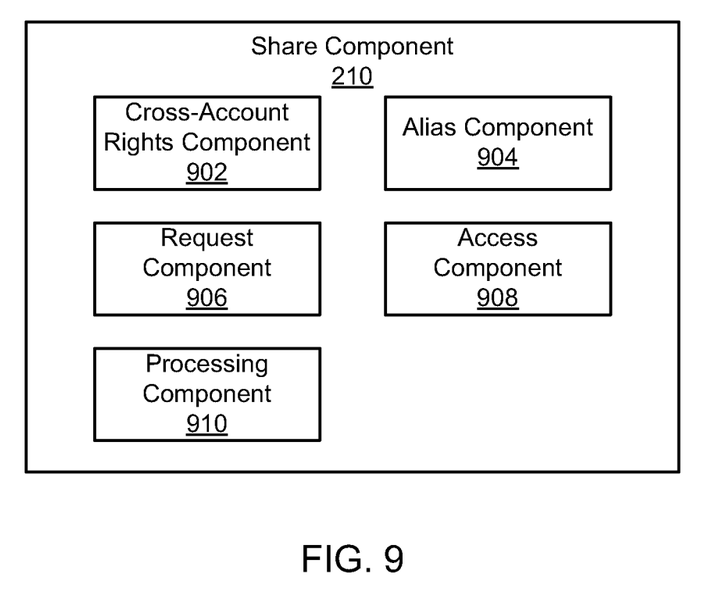
FIG. 9 is a schematic block diagram illustrating components of a share component, according to one embodiment.

FIG. 9 is a schematic block diagram of a share component 210. The share component 210 includes a cross-account rights component 902, an alias component 904, a request component 906, an access component 908, and a processing component 910. The components 902-910 are given by way of example only and may not all be included in all embodiments. For example, each of the components 902-910 may be included in or may be implemented as part of a separate device or system.

The cross-account rights component 902 is configured to create and manage rights or grants between accounts. The cross-account rights component 902 may generate a share object in a sharer account. For example, a user of the sharer account may provide input indicating that one or more resources should be shared with another account. In one embodiment, the user may select an option to create a new share object so that resources can be shared with foreign accounts. In response to the user input, the cross-account rights component 902 may create a share object in the sharer account. The share object may include a role to which access rights can be granted to resources for sharing with a foreign account. The foreign account may include a customer account or other account that is separate from the sharer account. For example, the foreign account may be another account hosted on a multi-tenant database system.

Upon creation, the share object may be granted rights to one or more resources within the sharer account. The resources may include a database, a schema, a table, a sequence, or a function of the sharer account. For example, the share object may contain a role (i.e., share role) which is granted right to read, select, query, or modify a data storage object, such as a database. The share object, or share role in the share object, may be granted rights similar to how rights may be granted to other roles using role based access control. A user may be able to access an account and grant rights to the share role so that the share role can access resources that are meant to be shared with foreign accounts. In one embodiment, the share object may include a list of objects, and an access level, for which the share role has rights.

The share object may also be made available or linked to specific foreign accounts. For example, the share object may store a list of accounts that have rights to the share role or share object in the sharer account. A user with the sharer account may add or remove accounts to the list of accounts. For example, the user may be able to modify the list to control which accounts can access objects shared via the share object. Foreign accounts listed or identified in the share object may be given access to resources with access rights granted to a share role of the share object. In one embodiment, a specific account can perform a search to identify share objects or sharer accounts that have been shared with the specific account. A list of available share objects can be viewed by a user of the target or specific account.

The alias component 904 is configured to generate an alias for data or a data object shared by a separate account. For example, the alias object may create, in a target account, an alias object corresponding to a shared resource shared by a sharer account. In one embodiment, the alias object is created in response to a target account accepting a shared resource or trying to access a shared resource for the first time. The alias object may act as an alias for a data object for the highest object hierarchy shared by the sharer account (see, e.g., FIG. 8 where D5 is an alias for D2). The alias component 904 may also generate a link between the alias object and a shared object (see, e.g., FIG. 8 where L1 is the link between D5 and D2). The link may be created and/or stored in the form of an identifier or name of the original or "real" object. For example, the link L1 in FIG. 8 may include an identifier for D2 stored in the alias object D5 that includes a unique system wide name, such as "A1. D2".

The alias component 904 may also grant a role in the target account (the account with which the sharer account has shared data or resources) access rights to the alias object (see, e.g., G1 of FIG. 8). Additionally, the alias component 904 may also grant the role in the target account to a share role in the share object of the sharer account (see, e.g., G2 of FIG. 8). With the alias object created, a link between the alias object and an object in the sharer account, and grants to a role in the target account, the target account may be free to run queries, statements, or "see" shared data or resources in the sharer account.

The request component 906 is configured to receive a request from an account to access a shared resource in a different account. The request may include a database query, select statement, or the like to access a resource. In one embodiment, the request includes a request directed to an alias object of the requesting account. The request component 906 may identify a resource with which the alias object is linked, such as a database or table in a sharer account. The request component 906 may identify the linked object based on an identifier of the alias object.

The access component 908 is configured to determine whether an account has access to a shared resource of a different account. For example, if a first account requests access to a resource of a different, second account, the access component 908 may determine whether the second account has granted access to the first account. The access component 908 may determine whether a requesting account has access by determining whether a share object identifies the requesting account. For example, the access component 908 may check if the requesting account is present in a list of accounts stored by a share object. The access component 908 may also check whether the share object that identifies the requesting account has access rights (e.g., grants) to the targeted data resource in the sharer account.

In one embodiment, the access component 908 may check for the presence of a grant from a share role in a sharer account to a requesting role in the requesting account. The access component 908 may check whether a link exists between an alias object to which a database request or statement was directed or whether a grant exists between a requesting role and the alias object. For example, the access component 908 may check for the existence or presence of one or more of L1, G1 and G2 illustrated in FIG. 8. Furthermore, the access component 908 may check for a grant between a role in a share object to an object (such as a table or database) of the sharer account. For example, the access component 908 may check for the existent of a grant between the role R4 and the database D2 in FIG. 8. If the access component 908 determines that the requesting account has access to the shared resource, the request may be fulfilled by the share component 210 or a processing component 910. If the access component 908 determines that the requesting account does not have rights to the requested data or object, the request will be denied.

The processing component 910 is configured to process database requests, queries, or statements. The processing component 910 may process and provide a response to a request from an account to access or use data or services in another account. In one embodiment, the processing component 910 provides a response to a request by processing the request using original data in a sharer account that is different from the requesting account. For example, the request may be directed toward a database or table stored in or for a first account and the processing component 910 may process the request using the database or table of the first account and return a response to a requesting, second account.

In one embodiment, the processing component 910 performs processing of shared data without creating a duplicate table or other data source in the requesting account. Generally, data must be first ingested into an account that wishes to process that data or perform operations against the data. The processing component 910 may save processing time, delay, and/or memory resources by allowing a target account to access shared resources in a sharer account without creating a copy of a data resource in the target account.

The processing component 910 may perform processing of the same data using different processing resources for different accounts. For example, a first virtual warehouse for a first account may process a database query or statement using data shared by a sharer account and a second virtual warehouse for a second account, or the sharer account, may process a database query or statement using the shared data of the sharer account. Using separate processing resources to process the same data may prevent contention for processing resources between accounts. The processing resources may include dynamically provisioned processing resources. In one embodiment, processing of shared data is performed using a virtual warehouse for the requesting account even though the data may be located in storage for a different account.

Figure 10:
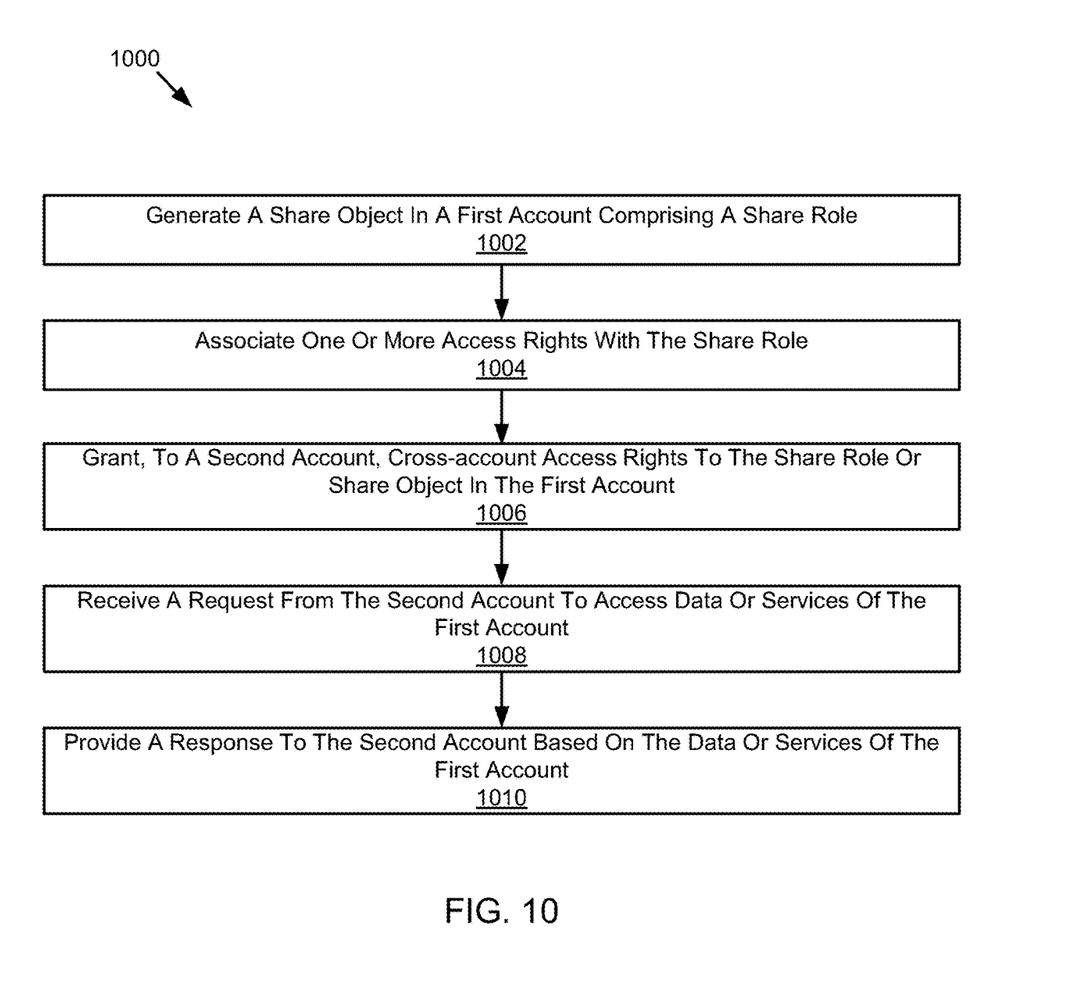
FIG. 10 is a schematic flow chart diagram illustrating a method for sharing database data between accounts, according to one embodiment.

FIG. 10 is a schematic flow chart diagram illustrating an example method 1000 for sharing database data or resources. The method 1000 may be performed by a database system, such as by a share component 210 as in FIG. 1 or 9 or by a database system as in FIG. 1, 2, or 3.

The method 1000 begins and a cross-account rights component 902 generates at 1002 a share object in a first account comprising a share role. The cross-account rights component 902 associates at 1004 one or more access rights with the share role, wherein the one or more access rights indicate which objects in the first account are accessible based on the share object. The cross-account rights component 902 grants at 1006, to a second account, cross-account access rights to the share role or share object in the first account. A request component 906 receives at 1008 a request from the second account to access data or services of the first account. A processing component 910 provides at 1010 a response to the second account based on the data or services of the first account.

Figure 11:
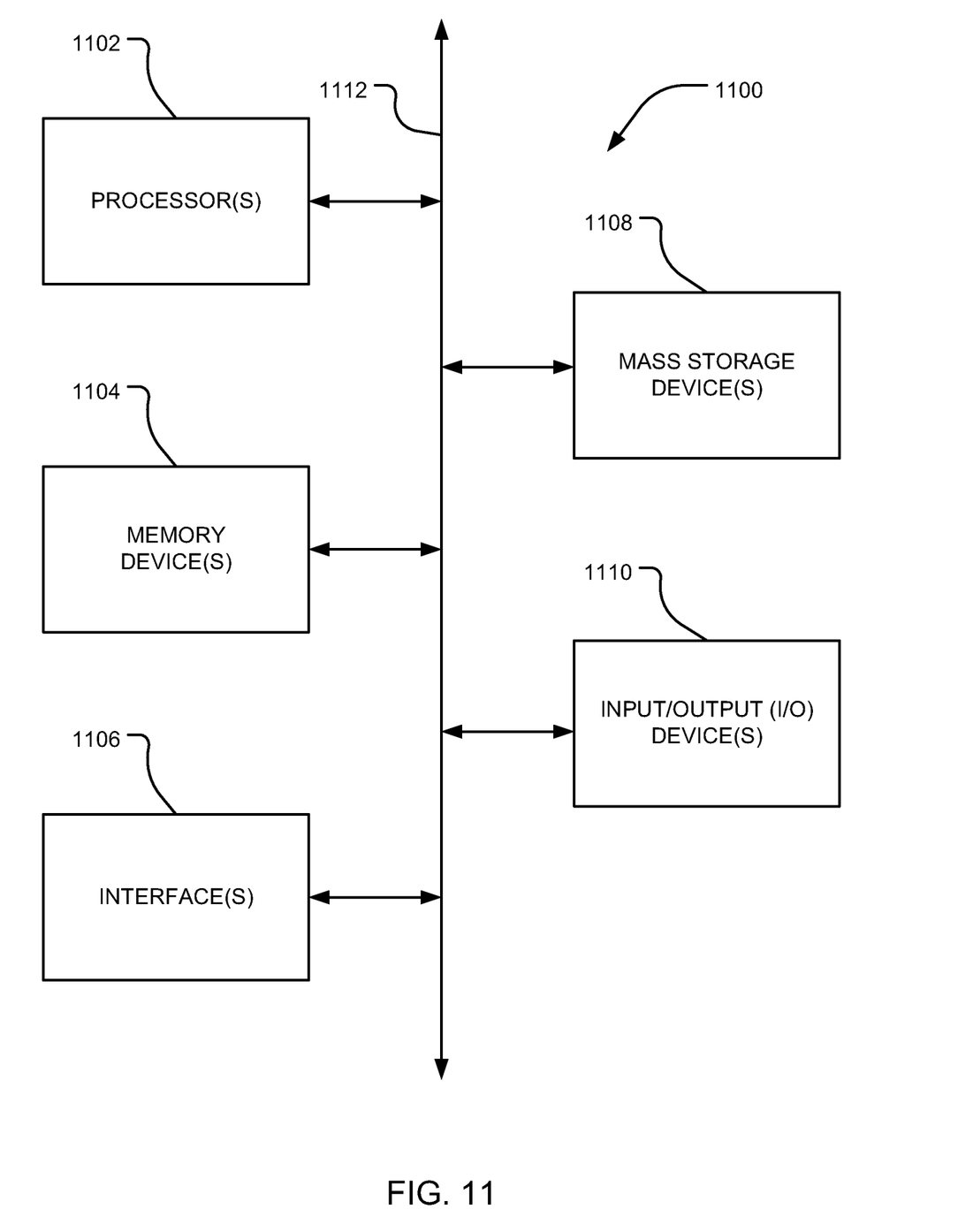
FIG. 11 is a block diagram depicting an example computing device or system consistent with one or more embodiments disclosed herein.

FIG. 11 is a block diagram depicting an example computing device 1100. In some embodiments, computing device 1100 is used to implement one or more of the systems and components discussed herein. Further, computing device 1100 may interact with any of the systems and components described herein. Accordingly, computing device 1100 may be used to perform various procedures and tasks, such as those discussed herein. Computing device 1100 can function as a server, a client or any other computing entity. Computing device 1100 can be any of a wide variety of computing devices, such as a desktop computer, a notebook computer, a server computer, a handheld computer, a tablet, and the like.

Computing device 1100 includes one or more processor(s) 1102, one or more memory device(s) 1104, one or more interface(s) 1106, one or more mass storage device(s) 1108, and one or more Input/Output (I/O) device(s) 1110, all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM)) and/or nonvolatile memory (e.g., read-only memory (ROM)). Memory device(s) 1104 may also include rewritable ROM, such as Flash memory.

Mass storage device(s) 1108 include various computer readable media, such as magnetic tapes, magnetic disks, optical disks, solid state memory (e.g., Flash memory), and so forth. Various drives may also be included in mass storage device(s) 1108 to enable reading from and/or writing to the various computer readable media. Mass storage device(s) 1108 include removable media and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Interface(s) 1106 include various interfaces that allow computing device 1100 to interact with other systems, devices, or computing environments. Example interface(s) 1106 include any number of different network interfaces, such as interfaces to local area networks (LANs), wide area networks (WANs), wireless networks, and the Internet.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

EXAMPLES

The following examples pertain to further embodiments.

Example 1 is a method for computer readable storage media storing instructions that, when executed by one or more processors, cause the processors to generate a share object in a first account comprising a share role. The instructions cause the one or more processors to associate one or more access rights with the share role, wherein the one or more access rights indicate which objects in the first account are accessible based on the share object. The instructions cause the one or more processors to grant, to a second account, cross-account access rights to the share role or share object in the first account. The instructions cause the one or more processors to receive a request from the second account to access data or services of the first account. The instructions cause the one or more processors to provide a response to the second account based on the data or services of the first account.

In Example 2, the one or more objects in Example 1 include one or more of a database object, a schema, a table, a sequence, or a function.

In Example 3, the instructions in any of Examples 1-2 further cause the one or more processors to associate the one or more access rights with the share role by storing a list of objects for which the share role has rights.

In Example 4, the instructions in any of Examples 1-3 cause the one or more processors to grant the one or more access rights by storing an indication of the second account in a list of accounts that have rights to the share role or share object in the first account.

In Example 5, the instructions in any of Examples 1-4 cause the one or more processors to receive the request by receiving a request directed to an alias object in the second account.

In Example 6, the instructions in any of Examples 1-5 cause the one or more processors to provide the response by processing the request using a virtual warehouse of the second account.

In Example 7, the instructions in any of Examples 1-6 cause the one or more processors to provide the response by processing the request without creating a duplicate table or other data source in the second account.

In Example 8, the instructions in any of Examples 1-7 further cause the one or more processors to determine that the second account has access rights to the requested data or services of the first account.

In Example 9, the instructions in Example 8 cause the one or more processors to determine that the second account has access rights by determining that a grant exists from the share object or share role to the first account.

In Example 10, the instructions in any of Examples 8-9 cause the one or more processors to determine that the second account has access rights by determining that a link exists between an alias object in the second account to the data or services of the first account.

Example 11 is a multi-tenant database system that includes a cross-account rights component, an alias component, and an access component. The cross-account rights component is configured to determine that cross-account access rights to one or more shared resources have been granted to a target account by a sharer account. The alias component is configured to create, in the target account, an alias object corresponding to a shared resource of the one or more shared resources in the sharer account. The access component is configured to allow the target account to access the shared resource using a request directed to the alias object.

In Example 12, the alias component as in Example 11 is configured to link the alias object in the target account to the shared resource in the sharer account.

In Example 13, the alias component as in any of Examples 11-12 is further configured to grant, to a role in the target account, access rights to the alias object.

In Example 14, the one or more shared resources as in any of Examples 11-3 include one or more of a database object, a schema, a table, a sequence, or a function of the sharer account.

In Example 15, the cross-account rights component as in any of Examples 11-14 is configured to determine that cross-account access rights have been granted based on a list of accounts that have rights to a share role or share object in the sharer account, wherein the share role or share object has rights to the one or more shared resources.

In Example 16, the access component in any of Examples 11-15 is configured to allow the target account to access the shared resources in response to determining that cross-account access rights have been granted based on the existence of a grant from a share object or share role in the sharer account to the target account.

In Example 17, the access component in any of Examples 11-15 is configured to allow the target account to access the shared resources in response to determining that cross-account access rights have been granted based on a link existing between an alias object in the target account to the data or services of the sharer account.

In Example 18, the system as in any of Examples 11-16 further comprises a processing component configured to process the shared resources in the sharer account without creating a copy of a data resource in the target account.

In Example 19, the system as in any of Examples 11-16 further includes a processing component configured to provide the response using a virtual warehouse of the second account.

In Example 20, the processing component as in any of Examples 18-18 is configured to provide a response to a request by processing the request using original data in the sharer account.

Example 21 is a method for providing access to shared data in a multi-tenant database. The method includes determining that a first account has granted a second account access to a database object of the first account. The method includes receiving a request from the second account to access the data object corresponding to the first account. The method includes processing the request using a virtual warehouse corresponding to the second account, wherein the virtual warehouse comprises a set of one or more compute nodes configured to access data in a storage layer corresponding to the first account to generate a response to the request.

In Example 22, determining that the first account has granted a second account access as in Example 21 includes determining that the first account lists the second account has having rights to a share object or share role in the first account, wherein the share object or share role has access rights to the database object of the first account.

In Example 23, receiving the request as in any of Examples 21-22 includes receiving a request directed toward an alias object in the second account, wherein the alias object is linked with the database object.

In Example 24, providing the response as in any of Examples 21-23 includes processing the request using data in a data object of the first account.

Example 25 is an apparatus including means to perform a method or realize an apparatus or system as in any of Examples 1-20.

Example 26 is a machine readable storage including machine-readable instructions, when executed, to implement a method or realize an apparatus of any of Examples 11-25.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
   granting to a second account of a multiple tenant database, access rights of a share object in a first account of the multiple tenant database, the share object having access rights to a database object of the first account and wherein access to the database object by the second account is based on the access rights of the share object; and generating, within the second account, an alias object that references the database object; and linking, by one or more processors, the alias object to the database object, wherein the second account accesses the database object using the access rights of the share object and directs a request to access the database object to the alias object.

2. The method of claim 1, further comprising:
granting the second account access rights to the alias object such that the second account accesses the database object using the access rights of the share object and by way of the alias object without copying the database object.

3. The method of claim 1, wherein the alias object serves as a proxy for the database object.

4. The method of claim 1, further comprising processing the request from the second account using a virtual warehouse corresponding to the second account, wherein the virtual warehouse comprises a set of one or more compute nodes configured to access data in a storage layer corresponding to the first account to generate a response to the request.

5. The method of claim 1, further comprising storing an indication that the first account has granted access rights to the database object to the second account in a list of share objects, wherein the list of share objects indicates which accounts have access rights to which share objects associated with the first account.

6. The method of claim 1, wherein the database object is a dataset and the first account grants access rights to the database object to multiple other accounts of the multiple tenant database such that the multiple other accounts can read the dataset without ingesting or copying the dataset using one or more virtual warehouses corresponding to the multiple other accounts.

7. The method of claim 1, wherein the database object comprises database data associated with the first account of the multiple tenant database.

8. A system comprising:
a memory; and
one or more processors operatively coupled to the memory, the one or more processors to:
grant to a second account of a multiple tenant database, access rights of a share object in a first account of the multiple tenant database, the share object having access rights to a database object of the first account and wherein access to the database object by the second account is based on the access rights of the share object;
generate, within the second account, an alias object that references the database object; and
link the alias object to the database object, wherein the second account accesses the database object using the access rights of the share object and directs a request to access the database object to the alias object.

9. The system of claim 8, wherein the one or more processors are further to:
grant the second account access rights to the alias object such that the second account accesses the database object using the access rights of the share object and by way of the alias object without copying the database object.

10. The system of claim 8, wherein the alias object serves as a proxy for the database object.

11. The system of claim 8, wherein the one or more processors are further to:
process the request from the second account using a virtual warehouse corresponding to the second account, wherein the virtual warehouse comprises a set of one or more compute nodes configured to access data in a storage layer corresponding to the first account to generate a response to the request.

12. The system of claim 8, wherein the one or more processors are further to:
store an indication that the first account has granted access rights to the database object to the second account in a list of share objects, wherein the list of share objects indicates which accounts have access rights to which share objects associated with the first account.

13. The system of claim 8, wherein the database object is a dataset and the one or more processors grant access rights to the database object to multiple other accounts of the multiple tenant database such that the multiple other accounts can read the dataset without ingesting or copying the dataset using one or more virtual warehouses corresponding to the multiple other accounts.

14. The system of claim 8, wherein the database object comprises database data associated with the first account of the multiple tenant database.

15. A non-transitory computer-readable medium having instructions stored thereon that, when executed by one or more processors, causes the one or more processors to:
grant to a second account of a multiple tenant database, access rights of a share object in a first account of the multiple tenant database, the share object having access rights to a database object of the first account and wherein access to the database object by the second account is based on the access rights of the share object;
generate, within the second account, an alias object that references the database object; and
link, by the one or more processors, the alias object to the database object, wherein the second account accesses the database object using the access rights of the share object and directs a request to access the database object to the alias object.

16. The non-transitory computer-readable medium of claim 15, wherein the one or more processors are further to:
grant the second account access rights to the alias object such that the second account accesses the database object using the access rights of the share object and by way of the alias object without copying the database object.

17. The non-transitory computer-readable medium of claim 15, wherein the alias object serves as a proxy for the database object.

18. The non-transitory computer-readable medium of claim 15, wherein the one or more processors are further to:
process the request from the second account using a virtual warehouse corresponding to the second account, wherein the virtual warehouse comprises a set of one or more compute nodes configured to access data in a storage layer corresponding to the first account to generate a response to the request.

19. The non-transitory computer-readable medium of claim 15, wherein the one or more processors are further to:
store an indication that the first account has granted access rights to the database object to the second account in a list of share objects, wherein the list of share objects indicates which accounts have access rights to which share objects associated with the first account.

20. The non-transitory computer-readable medium of claim 15, wherein the database object is a dataset and the one or more processors grant access rights to the database object to multiple other accounts of the multiple tenant database such that the multiple other accounts can read the dataset without ingesting or copying the dataset using one or more virtual warehouses corresponding to the multiple other accounts.

21. The non-transitory computer-readable medium of claim 15, wherein the database object comprises database data associated with the first account of the multiple tenant database.

* * * * *